United States Patent [19]

Chandramouli et al.

[11] Patent Number: 4,775,455

[45] Date of Patent: Oct. 4, 1988

[54] BINDER SYSTEM FOR ANODES, CATHODES, AND ELECTRODES

[75] Inventors: Pitchaiya Chandramouli, Louisville, Ky.; Benedict Letizia, Worthington, Ohio

[73] Assignee: Borden, Inc., Columbus, Ohio

[21] Appl. No.: 848,468

[22] Filed: Apr. 7, 1986

[51] Int. Cl.[4] ............ C25B 11/12; C04B 35/52; C08K 3/04

[52] U.S. Cl. ............ 204/294; 264/29.1; 264/105; 373/88; 252/511; 524/59; 524/63; 524/495; 524/496; 524/540; 524/541; 524/542

[58] Field of Search ............ 524/59, 63, 495, 496, 524/540, 541, 542; 523/220; 264/29.1; 252/511; 204/294

[56] References Cited

U.S. PATENT DOCUMENTS

| | | |
|---|---|---|
| 3,084,394 | 4/1963 | Bikerdike et al. .......... 423/460 |
| 3,109,712 | 11/1963 | Redfern .......... 423/449 |
| 3,197,527 | 7/1965 | Krummeich .......... 264/105 |
| 3,444,276 | 5/1969 | Olstowski et al. .......... 423/448 |
| 3,634,569 | 1/1972 | Emanuelsos et al. .......... 429/212 |
| 3,666,688 | 5/1972 | McCafferty .......... 252/503 |
| 3,838,188 | 9/1974 | Farrell .......... 423/449 |
| 3,907,950 | 9/1975 | Bickerdike et al. .......... 423/449 |
| 3,917,884 | 11/1975 | Jahn .......... 423/449 |
| 3,927,187 | 12/1975 | Luhleich et al. .......... 423/448 |
| 3,969,124 | 7/1976 | Stewart .......... 524/496 |
| 4,252,700 | 2/1981 | Furabiti et al. .......... 524/541 |
| 4,301,222 | 11/1981 | Emanuelson et al. .......... 429/251 |
| 4,348,343 | 9/1982 | Akerberg et al. .......... 523/144 |
| 4,366,191 | 12/1982 | Gistinger .......... 427/228 |
| 4,387,173 | 6/1983 | Henry, Jr. et al. .......... 524/63 |
| 4,431,503 | 2/1984 | Withers et al. .......... 204/294 |
| 4,479,913 | 10/1984 | Akerberg et al. .......... 264/29.5 |
| 4,526,924 | 7/1985 | Korb et al. .......... 524/496 |
| 4,550,015 | 10/1985 | Korb et al. .......... 423/449 |
| 4,624,766 | 11/1986 | Boxall et al. .......... 204/294 |
| 4,624,984 | 11/1986 | Korb et al. .......... 524/541 |
| 4,626,569 | 12/1986 | Waitkos et al. .......... 524/541 |

FOREIGN PATENT DOCUMENTS

| | | | |
|---|---|---|---|
| 210505 | 12/1982 | Japan .......... | 252/511 |
| 200440 | 12/1982 | Japan .......... | 252/511 |
| 0936514 | 9/1963 | United Kingdom .......... | 524/496 |

Primary Examiner—John C. Bleutge
Assistant Examiner—David W. Woodward
Attorney, Agent, or Firm—Robbins & Laramie

[57] ABSTRACT

Describes the use of high performance phenol-formaldehyde resins in the fabrication of anodes, cathodes, and electrodes, for use in metallurgy. A carbonaceous aggregate mixed with binder material is formed into a compacted mass in a desired shape, and the resin is permitted to cure to form a self-sustaining shape. Upon carbonization of the shaped, compacted mass, electrodes and other desirable shapes may be produced. Also useful for ramming and tamping mixes. Provide environmentally safe binder replacements for coal tar pitch while providing excellent residual carbon contents and desirable electrical and physical properties.

63 Claims, No Drawings

BINDER SYSTEM FOR ANODES, CATHODES, AND ELECTRODES

BACKGROUND OF THE INVENTION

This invention pertains to the manufacture of carbonaceous and graphitic articles such as the anodes, cathodes, and electrodes used in the aluminum and steel industries. Tars and pitches have been used as binders for carbonaceous aggregates for some time. This type of mix has found wide usage in making electrodes for the aluminum industry and in making refractories for use in basic oxygen steelmaking furnaces, electric arc steelmaking furnaces, and iron and steel ladles. The tars and pitches serve not only to bond the aggregate together during the manufacture process, but when the shaped mix is heated to a pyrolysis or carbonizing temperature, the pitch decomposes and carbon is deposited within the pore structure and around the aggregate. This carbon residue, resulting from pyrolysis of the pitch or tar at high temperature, forms a strong carbon bond between the aggregates.

The techniques used in the manufacture of tar or pitch bonded articles have been well established. For example, a size graded batch of aggregate is intimately mixed with pitch and other carbonaceous materials at 250° to 300° F. The resulting mixture is formed into shapes on a press. As the shapes cool, the pitch solidifies and forms a strong bond. Since tars and pitches are not thermosetting materials, they will again melt and soften and cause the shapes to become very weak in the 200° to 600° F. temperature range. If a shaped article of this type were used in a high temperature environment requiring mechanical strength, the shapes would be subject to fragmental breaking, spalling and undesirable subsidence.

In order to eliminate the problems associated with the softening of pitch bonded shapes in the temperature range of 200° to 600° F., resin binders have been sought as substitutes. Resins have been sought because they not only function as a pitch does in a mix in reference to binding the aggregate during molding, and yield a substantial amount of carbon upon pyrolysis, but also cure to a thermoset material. The ability of a resin to cure to a thermoset material eliminates the problem of the binder softening in the 200° to 600° F. temperature range.

While the use of resins solves the strength problem at low temperature, shapes bonded with resins do not exhibit a strengthening effect above 600° F. as pitch bonded shapes do.

While the use of coal tar pitch as the binder in the manufacture of carbon/graphite anodes, cathodes, and electrodes for the metal industry has provided products with excellent physical and mechanical properties and continues to be used as a economically cheap bonding agent in the anode, cathode, and electrode industry, coal tar pitch binders involve serveral problems. One area of considerable concern is the environmental and personal hygiene problems associated with use of coal tar pitch. Coal tar pitch has come under considerable scrutiny due to its suspected carcinogenic properties. This has necessitated extensive environmental controls in the work area and extensive safety precautions to insure minimal worker exposure to coal tar pitch.

When coal tar pitch is used as a bonding agent, retention of shape and prevention of sagging of the molded articles is a problem, because of the inherent thermoplastic nature of the coal tar pitch. To overcome the problem extended and prolonged baking cycles are required. In the highly energy intensive market place and especially with the high cost of energy, this is perceived as a major drawback. Ways to cut down on energy requirements for the manufacture of electrodes are being pursued. For example, U.S. Pat. No. 4,431,503 describes specific improvements in the manufacture of pre-baked carbon containing electrodes for the aluminum industry which allow a reduction on energy requirements. In the aluminum industry, electrodes are of two types: pre-baked electrodes and the continuous self-baking electrodes made with carbon paste. The process for the manufacture of these electrodes consists essentially of preparing a "coke" and a binder mixture called a green mixture. For pre-baked electrodes, the green mixture is shaped and fired. For continuous self-baking electrodes such as Soderberg anodes, the green mixture is fed directly to the operating anode of the electrolytic furnace.

The pre-baked electrodes of U.S. Pat. No. 4,431,503 are made with a binder containing approximately equal weight amounts of a liquid phenolic resole resin and coal tar pitch. As described in Example 4 of U.S. Pat. No. 4,431,503, it is evident that a combination of the phenolic binder and coal tar pitch is essential for adequate performance.

In addition to pre-shaped articles such as the anodes, cathodes, and electrodes, coal tar pitch is also traditionally used as a bonding agent in the process industries mentioned above and in tamping and ramming mix compositions. These compositions are used to form monolithic shapes as well as to conduct on site repair work of refractory linings and the like. In these applications, it is essential that the coal tar pitch is pre-fired to insure carbonizing of the pitch and to insure that the thermoset stage is achieved. Pre-firing must be done during downtime of the work station. The downtime results in a loss of productivity. Additionally, improper heating cycles during the pre-firing steps may lead to an excessive flow of the coal tar pitch. This may lead to even greater health and safety hazards.

Therefore be it in the manufacture of anodes, cathodes, and electrodes, or in the use of binders in making monolithic shapes, workers in the working environment have to contend with the considerable amount of organic fumes emitted by the coal tar pitch. This is highly undesirable for personal hygiene reasons as well as health hazard considerations. The industry recognizes the problem but in the absence of suitable alternative binder systems, can only try to cope with the situation. Industry continues to live with the health hazards of coal tar pitch.

The traditional pre-baked anodes, cathodes, and electrodes are made from a green mixture containing as a binder about 15–30% of coal tar pitch, by weight based on the weight of the mixture of aggregate and binder. Efforts in reducing the amount of coal tar pitch have reportedly resulted in inferior performance of the shaped articles. The prior art indicates that when the then available phenol formaldehyde resins were used as bonding agents in the electrode applications, resin levels of 20%–50% are required for reasonably satisfactory performance. Published literature as described in *Encyclopedia of Chemical Technology* edited by Kirk and Othmer 2nd Edition, Volume 4, pages 158–243, and *Carbon and Graphite Handbook* by Martell, Chapters 14, 15, 16 and 17 refer to the use of phenolic resins but report inferior performance properties.

There are other problems that the industry faces because of using coal tar pitch. There are problems due to the fluctuations and variations in the quality of coal tar pitch. Another problem is the presence of undesirable elements such as sulfur and chlorides in pitch which impair the electrical properties of the anodes, cathodes, and electrodes as well as the lives of the electrolytic cells.

Referring now specifically to the aluminum anode industry, thermal shock resistance of the anode is a very critical performance parameter. Another critical parameter is baked density of the anode. Density directly influences such properties as strength, erosion resistance, and electrical resistivity of the anode. A related parameter is the porosity of the anodes. Increased levels of porosity can detrimentally affect the critical performance parameters of the anodes.

The pre-baked anodes for the aluminum industry are made from a green mixture containing as binder about 15%-20% coal tar pitch of a selected grade which is defined by specific solubility level requirements in quinoline. Coal tar pitch levels of as high as 30%-35% are used in the Soderberg process. Extensive fume evolution and loss of volatiles lead to poor densities. These drawbacks have rendered the Soderberg process most obsolete. Even in the pre-baked anode manufacture, porosity is a major problem and needs to be strictly controlled.

In the manufacture of the pre-baked anodes, problems in fracture of anodes due to extensive vapor release, and the problem of extensive energy consumption due to the prolonged and slow baking cycle as well as the resultant loss in productivity are key factors worthy of consideration.

SUMMARY OF THE INVENTION

It has been found in accordance with the present invention that several of the above mentioned problems faced by the anode, cathode, and electrode manufacturing industry because of the use of coal tar pitch binders can be successfully overcome by using high carbon, i.e., high coking value, phenol formaldehyde novolac and resole binders in accordance with the present invention. These resin binders are used in place of traditionally used coal tar pitch. These resin binders are environmentally safe and are economically viable replacements for coal tar pitch. The resins provide excellent residual carbon content to the final product and give the final product desired electrical and physical properties.

The various embodiments of this invention include the use of high carbon contributing phenol formaldehyde novolac binders with high melt points, above 100° C., and which are characterized by low volatiles including no more than 4% free phenol and more preferably no more than 2% free phenol content. The novolac binders can be used by themselves or in conjunction with certain liquid phenol formaldehyde resole resins. The liquid phenol formaldehyde resole resins are also characterized by excellent carbon contributing characteristics as well as by superior aggregate wetting characteristics.

The novolac resins alone require the use of a curing agent, preferably hexamethylenetetramine (hexa), to achieve the desired cured density and strength as well as the desired performance characteristics of the shaped, cured articles. When a high carbon contributing novolac binder is used in conjunction with a phenol formaldehyde resole resin, the use of hexamethylenetetramine (hexa) or other curing agent often may be omitted, if desired. Mix life characteristics, flow characteristics, and the like would dictate the use or non-use of hexa with the novolac and the resole liquid combination. While generally the novolac is used in flake or hot melt form, when used with a liquid resole for applications where flow characteristics are important, as in a ramming mix, the novolac may be powdered.

This invention in one embodiment provides high carbon phenol formaldehyde novolac and resole binders for use as bonding agents for anode, cathode, and electrode manufacture as well as in monolithic shape applications in the aluminum and allied process industry applications. The resins can be used at substantially reduced levels compared to the excessive quantities of coal tar pitch that are traditionally used in the above mentioned industries. Thus for example, one can achieve satisfactory performance in the above mentioned application areas, by using a total phenol formaldehyde resin level of about 10%-15% by weight or less and more preferably about 6%-8%.

This invention can provide substantial energy savings in the manufacture of pre-baked shaped articles. Thus for example one can achieve substantially complete cure of the phenol formaldehyde resins at temperatures of 150° to 200° C., and total integrity of the cured article is achieved. The cured article can then be rapidly heated to the carbonizing and graphitizing cycles, as the case may be. This gives considerable productivity advantages, particularly as compared to prior art practices where coal tar is used.

One advantage of this invention is that is is possible to provide improved porosity control leading to improved densities of the pressed and cured articles because of the use of a reduced quantity of the binder. As will be evident to one practicing the art, it is the binder that contributes the volatiles during carbonization and graphitization, and use of reduced binder levels should logically provide improved product densities. Moreover, the resins used in the practice of the invention are selected to have low or carefully selected volatiles contents.

Turning now to monolithic shape constructions, ramming and tamping mixes are often used for construction in the cathode area of the electrical cells. Ramming and tamping mixes should be of sufficient consistency so they can be applied to the surface contours to achieve in situ monolithic shape construction. When the ramming mix contains a prior art pitch binder, the shape construction must be pre-fired and considerable downtime of the work station is required. If a ramming mix of this invention is used, less downtime of the work station is needed. When a ramming mix according to this invention is used containing a phenol formaldehyde novolac and/or resole binder, it can be applied either on cold or on hot surfaces. When applied on cold surfaces and when rapid setting of the mix is essential, according to preferred embodiments of this invention, a cure accelerator, such as an acid, would be used. The acid can be an organic or an inorganic acid, and examples of such acids are known to one skilled in the art. Toluene sulfonic acid, benzene sulfonic acid and formic acid, are organic acids that can be used. Boric acid and sulfuric acid are mineral acids that can be used. The selection of one acid over the other would depend on the mix life, the workability characteristics of the mix as well as the desired setting times.

In one preferred embodiment, the invention is a raw batch composition for use in making a shaped self-sustaining article. This raw batch composition comprises a mixture of a carbonaceous aggregate, a curable binder in sufficient quantity when cured to bond said aggregate into a desired shape that is self-sustaining, and a curing agent effective for curing said binder, under curing conditions. The curing agent is present in sufficient amount to effect curing of said binder, under curing conditions. The binder may comprise a phenol-formaldehyde novolac resin in particulate or hot melt form. The novolac is one that has a melting point of at least 100° C. and a total volatiles content at 135° C. of not more than 5% by weight of the resin, including a free phenol content of not more than 4% by weight of said resin as measured by gas chromatography analysis.

In another preferred embodiment, the invention comprises a raw batch composition for use in making a self-sustaining shape that can be pyrolized to form an electrode. Saw a raw batch composition comprises a mixture of a carbonaceous aggregate and a binder. The binder comprises a phenolic resin, and provides a weight of residual carbon following pyrolysis, based on the weight of the binder originally present prior to pyrolysis, of at least 35% or more, and preferably, at least 50%.

In another preferred embodiment, the invention is a self-sustaining shape comprising particles of a carbonaceous aggregate bonded together by a binder. The binder comprises a cured phenol formaldehyde resin that prior to curing was selected from the group consisting of a phenol formaldehyde novolac resin in particulate or hot melt form, having a melting point of at least 100° C., a total volatiles content at 135° C. of not more than 5% by weight of said resin including a free phenol content of not more than 4% by weight of said resin as measured by gas chromatography analysis, a liquid phenol formaldehyde resole having a viscosity of at least 150 cps, and mixtures of the novolac and of the resole.

PREFERRED EMBODIMENTS OF THE INVENTION

The invention in one aspect is a raw batch composition. The important components are a carbonaceous aggregate and a binder. Both the carbonaceous aggregate and the binder are selected with a view toward the particular end product that is desired.

For most purposes, the carbonaceous aggregate will comprise coke aggregate, as is common in the production of electrodes for use in the metallurgical industries such as aluminum production. Coke aggregate may be a material such as petroleum coke or calcined anthracite. Generally, the aggregate particles will be graded to a particular size range to facilitate packing of the aggregate particles under compression. Packing by a vibaration technique is commonly used and represents a preferred approach to making high density bodies.

For making electrodes, the carbonaceous aggregate may include carbon powder, graphite powder, or mixtures of these. Generally such powders have particle sizes on the order of 325 mesh or so, but may be in the range from 200 mesh to 325 mesh. Such very fine particle sizes facilitate packing and the production of high density articles.

The binder is generally formed from one or more selected resins. The resins are selected for relatively low volatiles content and for high cured strength. They are also selected to have high coking value, that is, to provide in situ following carbonization, at least 35% or more, and preferably 50% or more, by weight of carbon based on the original weight of the resin. Often it is desirable, as will be describd more particularly, to include one or more curing agents in the binder. For applications where high flow characteristics are desirable, such as for ramming and tamping mixes, the binder may also include a plasticizer and a curing accelerator such as a Lewis acid.

Phenol formaldehyde novolac resins having melting points of 100° C. or more, as measured by the ring and ball method, as measured by a volatiles content test at 135° C., may be used in the practice of the invention. The most preferred resins have a resin melt point of 110° C. or greater and having a volatiles content of not more than 5%. The most preferred embodiment of the invention uses resins with a volatiles content of not more than 2%. Additionally, the volatile content of free phenol in the novolac must be controlled to be no more than 4% and more preferably to no more than 2% as measured by the use of gas chromatography, the free phenol content being considered a part of the total volatiles content.

A novolac resin is one prepared with a deficiency in aldehyde so that it may not be cured unless a curing agent such as hexa is added. A novolac resin may be defined as the resinous reaction product of a phenol and an aldehyde that, for practical purposes, does not harden or convert to an insoluble, infusible condition upon heating but remains soluble and fusible.

In curing a novolac resin, a curing agent is used, such as hexa, to overcome the deficiency of aldehyde-bridging groups. The added curing agent may be an aldehyde such as formaldehyde or an alkylene-providing compound, such as hexamethylenetetramine, which provides methylene groups for curing.

The novolac compositions may be used in the form of a flake, powder or a hot melt. For resin efficiency considerations and for uniform aggregate coating, the resin may be used either as a hot melt or in flake form for coating hot aggregates. If the novolac resin is the only resin used the use of a curing agent, preferably hexa, is required. While those practicing the phenolic resin art would envisage using hexa contents of up to 15%-20% by weight of the resin, the preferred embodiments of this invention require that the hexa content be kept to a minimum. The preferred hexa content is in the range of 6%-10% based on resin weight.

The liquid resole resins that may be used in the practice of this invention include phenol formaldehyde resole resins having a viscosity of at least 30 cps, preferably 50 cps, and more preferably 150 cps to 450 cps. For liquid resin stability considerations as well as storage and application considerations, the preferred resins of this invention are the low viscosity resole resins because they have better aggregate wetting characteristics. Good wetting of coke, carbon, and graphite particles is provided by commercially available resins with viscosities up to about 500 cps as measured by a Brookfield RVF viscometer at 20 rpm at a temperature of 25° C. being measured with a #1 spindle.

Liquid resole resins having viscosities as low as 30 cps to 40 cps can perform well. However, resins in the 30 cps to 450 cps range, or better yet the 150 cps to 450 cps range, are preferred. Another important characteristic of the resole resins is their free phenol content. The free phenol content should be less than 30% and more preferably in the 10%-25% free phenol content range. Molecular weight distribution is also important. The melting point of the resin reflects the molecular weight distribution.

A resole resin is the resinous reaction product of a phenol and an aldehyde which as been condensed (reacted) only to a stage where it still melts when heated and is still soluble in acetone, and the resin still has sufficient residual reactivity that it may be cured by heat to an insoluble and infusible condition, without the addition of a curing agent. A resole resin is also known as an "A stage" phenolic resin, or as a "single stage" resin, because it is curable without the addition of any crosslinking agent. Upon progressing from the resole or "A stage" resin by heating, an intermediate stage is reached before the final insoluble, infusible cured condition is reached. This intermediate stage or "B stage" resin is termed a "resitol".

A "resitol" is a resin of the same type as the resole except that the aldehyde-phenolic condensation has been carried out to the stage where it has become infusible but upon heating, will soften but not melt. The "resitol" swells in acetone but is insoluble in it.

A resole resin is often prepared by using the aldehyde in a molar proportion greater than 1-1 with the phenol, but may be prepared at an aldehyde:phenol molar ratio as low as 0.7:1. Since sufficient aldehyde is already present to give a cure to the insoluble infusible state, there is no need to add a curing agent such as hexa for final curing. However, in preparing the resole resin it may be desirable to add a small amount of hexa. The amount of hexa is small enough that the resole retains its properties of fusibility and acetone solubility and is fused only by continued heating. However the amount of hexa used in preparing the resole is not calculated in the amount which may be subsequently added to aid in the curing of a novolac resole mixture.

In using liquid phenol formaldehyde resole resins, one may use the liquid phenol formaldehyde resole resin as the sole resin and in that case, improved carbon efficiencies of the resins can be achieved by admixing the liquid phenol formaldehyde resin with up to 10% hexa by weight based on the resin solids. Such liquid phenol formaldehyde resole resins would normally provide about 35%-40% carbon content when cured by itself, i.e., without an added curing agent. A carbon content of 55%-60% is achievable by co-curing the resole with 5% or so hexa, by weight based on the resin solids. The use of hexa also provides improved density and porosity control of the pressed articles.

In other cases, depending on the type of application, one can use a combination of the novolac and the liquid resole resins. In using such combination, one would either use the novolac-resole resin mixture without hexa, or use the novolac resin, the liquid phenol formaldehyde resole resin, and hexa. To achieve plasticity and flow control of a resin coated aggregate mix compositions, one may wish to add a small quantity of one or more plasticizers such as ethylene glycol.

Thus the preferred teachings of this invention, in summary, involve the use as a binder (1) a phenol formaldehyde novolac resin with a melt point characterized by the ring and ball method of greater than 110° C. and a controlled volatiles content of no more than 4%, preferably no more than 2%, the volatiles content including a free phenol content of no more than 4% and preferably no more than 2%, as determined by gas chromatography analysis, and (2) liquid phenol formaldehyde resole resin compositions with viscosities in the range of 50 cps to 450 cps and free phenol contents of 10%-25%, as determined by gas chromatography analysis. The resins may be used individually or mixed, in combination with hexa as desired. Additionally, when these resins are used as binders for tamping and ramming compositions, the use of cure accelerators such as organic and/or inorganic acids as well as certain types of amines are recommended so as to impart rapid setting characteristics at ambient temperatures. Generally any Lewis acid, that is compatible with the resin system and with the intended end use, may be used as a curing agent and/or curing accelerator.

In accordance with particular embodiments of the present invention, it has been found that carbonaceous aggregates can be bonded together to form self-sustaining shapes through the use of a binder that may be a mixture of at least one novolac and at least one resole. Of course unmixed novolac resin is preferred for some applications, such as anode production. However, for other applications, 20%-80% by weight of a solid phenolic-aldehyde novolac resin and 20%-80% by weight of a liquid phenolic-aldehyde resole resin, the percentages being based on the combined solids contents of the two resins, may be used. The aldehyde in the novolac resin may comprise at least about 50 molar percent of the resin. Although the two resins may be cured together in admixture with no added curing agent, it is very often advantageous to have a small amount of a curing agent such as hexamethylenetetramine (hexa) present. Thus the composition may contain 0-20 parts, preferably 6-10 parts of hexa per 100 parts of resin solids.

Another important factor when a mixture of a particulate novolac and a liquid resole is used is that the novolac resin has an initial fine particle size to permit intimate and uniform mixture of blending of the two resins. The particle size is advantageously less than 40 mesh, preferably not substantially greater than 200 mesh, and most preferably no greater than 32 microns in size. (Mesh sizes are measured throughout on U.S. Standard sieves and screen analyses are performed according to ASTM Method D1921-63.)

The novolac resin that is used whether alone or in admixture with a liquid resole, should possess the characteristics already described. That is, it should have a melting point of at least 100° C., and preferably at least 110° C. The higher the melting point, the higher the coking value or residual carbon left in the carbonized body after pyrolysis. The novolac also should have a low volatiles content, the total volatiles being not more than 5% by weight of the resin including not more than 4% by weight of free phenol, and more preferably, total volatiles should be not more than 2% by weight of the resin including not more than 2% by weight of free phenol. The volatiles content is measured at 135° C. This is a standard test in the phenolic resin industry, and indicates true solids.

The selection of the resin will depend upon the particular end use for the article that is to be manufactured. For anode production, generally no liquid resin will be used, just a novolac. One reason for this is that the liquid resins that are suitable for use tend to have a relatively high total volatiles content that might interfere with the achievement of high density. However, some liquid resin may be added to the novolac to improve flow either under compression or during vibration, for the achievement of high density. When a mixture of particulate novolac and liquid resole is used, generally the weight ratio of resole to novolac is 1:3 maximum, but a ratio of 1:4 is more preferred in most cases. The same considerations are applicable to cathode production. For a ramming or tamping mix, however, where more fines are normally present in the carbonaceous aggregate, the mix is ordinarily desired to be in a paste form. More fines are generally present and more liquid is needed to achieve the desired consistency.

The term "carbonaceous aggregate" is used herein to refer to the particulate carbon-containing material that is used in making the raw batch compositions according to the present invention. These raw batch compositions are intended to be formed into desired shapes, generally under pressure, and the resin binder for the carbonaceous aggregate is then cured. For making electrodes of some kinds, and for many refractory-type applications, the shape is subjected to a heat treatment to carbonize or graphitize the carbonaceous aggregate and the resin binder. Both cold pressing and hot pressing techniques may be used to form the raw batch compositions into desired shapes. The binder must be used in sufficient quantity, and must have the necessary strength characteristics upon being cured, so that the formed shapes are self-sustaining. The term "self-sustaining" is used to refer to a shape that will retain its dimensions and contours during processing. Such processing may take place at room temperature or at more elevated temperatures.

For example, the resin binder may be one that cures at room temperature. Nevertheless, that binder must hold the shape together during subsequent processing, which may involve a gradual increase in temperature up to 600° C. or 700° C. or higher. At those temperatures, carbonization may occur, and generally sufficient strength is developed in a carbonized binder to hold the article in the desired shape during carbonization and even during graphitization.

The carbonaceous aggregate preferably is a sized coke aggregate. Thus the aggregate may be a mixture of fine particles, coarse particles, and an intermediate fraction of particles. Generally, all of these particles will have sizes in the range from 4 mesh to 200 mesh. Preferably, however, the mixture is graded, so that the fines comprise about 40% of the aggregate and pass through 100 mesh but are retained on 200 mesh, and the coarse particles comprise about 50% of the aggregate and are passed through 4 mesh but are retained on 14 mesh. The intermediate fraction of particles the balance, that is, consists of particles intermediate between the fines and the coarse.

Depending upon the intended use, the carbonaceous aggregate may be formed of particles derived from premium petroleum coke, regular petroleum coke, anthracite coke, and the like. For some purposes, coal particles may be included in the mix in small quantities. In some cases, it may be desirable also to include powdered carbon, powdered graphite, or mixtures of these. Generally powdered carbon would be incorporated in a substantial quantity in a carbonaceous aggregate intended for use in a tamping or ramming mix, or for the production of electrodes. As a practical matter, powdered carbon and powdered graphite would not be used alone because they would not lead to an electrode having desired electrical properties. Rather, such powdered materials would be used in combination with coke aggregate.

For anode production, for example, the carbonaceous aggregate would comprise petroleum coke, anthracite coke, or perhaps a mixture of these. The particle size would be in the range from 4 mesh to 200 mesh. Powdered graphite or powdered carbon would be incorporated in the aggregate to improve density or to improve electrical properties, in an amount up to about 10% by weight of the carbonaceous aggregate. For the production of a cathode, a ramming or tamping mix, or a refractory, the proportion of coke aggregate to powdered carbon or graphite in the carbonaceous aggregate would be as for anode production, that is, a ratio of about 90% coke aggregate to 10% or less powdered graphite or powdered carbon or powdered mix. The selection of such materials is a matter which the skill of the art in making anodes, cathodes, and electrodes, and in forming mixes suitable for ramming or the like and for making monolithic articles.

For anode, cathode, and electrode manufacture, the preferred process involves coating the carbonaceous aggregate through the use of a hot melt novolac resin. However, a flake resin may also be used. From the standpoint of obtaining electrode characteristics of density, porosity, strength, and other electrical and chemical characteristics, the preferred novolac resins will be those having melting points above 100° C., and preferably in the range from 110° C. to 130° C. Melting points as high as 160° C. to 170° C. can be used, but involve the attendant penalties of increased energy costs.

The liquid resole resins may be used for their ability to wet and coat the particles of the carbonaceous aggregate. Generally the resin should not impregnate the aggregate and its viscosity is selected with that in mind. The novolac and liquid resole resins may be used separately, individually, or in tandem, that is, sequentially, or in a mixture with each other. The presence of hexa is often advantageous, although other curing agents may be used. When the end use for the raw batch composition using these resins is a tamping or ramming composition, then it may be desirable to incorporate in the raw batch composition a cure accelerator to impart rapid setting characteristics at ambient conditions. Suitable such curing accelerators include generally the Lewis acids, and particularly organic acids, inorganic acids, and certain of the amines, such as, for example, triethyl amine, triethanolamine, and generally, the secondary and tertiary amines.

The binder component may include materials other than the resin or resins. Generally the amount of resin solids in the binder amount to from about 10% to about 15% by weight based on the weight of the carbonaceous aggregate, and preferably, from about 6% to about 8% by weight. For anode production, the resin generally will consist essentially of a novolac resin in hot melt form preferably, although a flake resin may be used. The binder in that case ordinarily would include an appropriate amount of hexa to effect curing. For cathode production, hexa would also be used if the self-sustaining shape is to be made using an oven or other high temperature cure. If the resin selected cures at room temperature, then ordinarily in place of hexa or equivalent curing agent, an acid will be used as a curing accelerator.

Suitable manufacturing methods, for processing the raw batch compositions to form first, self-sustaining shapes, sometimes referred to as green bodies, and then, carbonized or graphitized products, will now be described by way of further description of the invention.

MANUFACTURING PROCESSES AND METHODS OF USE

HOT COATING

A suitable hot coating process consists of the following steps. A coke or carbon/graphite aggregate is heated to 175°-200° C. and then transferred to a muller/mixer with heating capabilities to maintain the elevated temperature. A flake novolac resin is uniformly distributed on the aggregate while mixing to insure uniform melting of the flake and coating of the aggregate with the molten resin. Alternatively, to hot or cold aggregate mix, one may add a molten phenolic novolac resin of the type described above.

When all of the resin is added to the mixer, mixing is continued to insure uniform coating of the particles. By this time the mix temperature typically drops to about 275°-300° F. (135°-150° C.).

Hexa is added to the muller/mixer as a water solution. After the hexa solution is added and on further continuous mixing, the mix will go through a typical build-up phase and then rapidly begin to crumble down into a fine free flowing material. Any lumps at this juncture must be broken down. Alternatively, hexa may be added as solid powdery granular material.

As to pressing conditions, one may choose either isostatic or compression molding, or vibration pressing. One may also extrude as in the case of electrode shapes. For density control, one may use some plasticizers such as alcohols, glycols and the like. The curing can be achieved by either during in hot molds or by cold pressing and transferring the shapes or pressed articles to an over or kiln for gradual curing. The curing cycle, in an oven (kiln or furnace), would typically consist of heating the prepressed or shaped articles slowly to 100°-114° C. at a rate not exceeding 20°-30° C. per hour and holding at this temperature to permit the release of volatile material. Once the volatiles cease to evolve, the temperature may be rapidly increased to 175°-200° C. at 40°-50° C. per hour (depending on the limitations of the heating system and the size and shape of the article). Phenolic resins typically cure in the range of 135°-150° C. An environmental temperature range of 175°-200° C. should insure that adequate heat transfer takes place and the core of the shaped or pressed article reaches the desired 135°-150° C.

The cured article with the phenolic binder system is self-sustaining, i.e., it has rigidity and sufficient strength to undergo the more rapid heating of the carbonizing cycle. This is one of the areas where energy saving advantages will be realized since rapid escalation of the heating cycle to carbonizing conditions and even graphitizing is possible.

COLD COATING AND PRESSING

For cold coating and cold pressing operations, the aggregate is placed in a muller/mixer and a liquid resole resin of the type described above is added to the muller while mixing. One problem that can be encountered when using liquid resins is that as more liquid resin is added, the mix consistency can get soupy and complicate further handling. The liquid resin requirement which avoids this problem will depend on the operating conditions as well as the particle size distribution of the aggregate. The liquid phenolic resin alone may not provide the desired green and coked strength. Hence the use of powdered phenolic novolac resin in combination with the liquid binder may be desirable. Alternatively hexa maybe added to the mix to achieve the same end result.

The resin coated aggregate may be pressed under cold conditions and the pressed articles transferred to a curing oven/furnace. Curing is carried out as described in the curing step for hot coating.

While the above procedures do not specifically refer to the Soberberg process of aluminum anode manufacture. One practicing the art will readily realize the utility of the invention for the production of Soderberg anodes, with very definite advantages.

CATHODIC (MONOLITHIC) PLASTIC MIXES

For a cathodic (monolithic) plastic mix application, one would use a liquid resole resin of the type described above either with or without hexa. Alternatively a combination of the liquid resole resin and the solid novolac resin (preferably in the powder form) can be used, with or without hexa. Additionally, one can use the novolac resin in conjunction with a plasticizer such as alcohols or glycols.

The plastic mix of carbonaceous aggregate and resin may be extruded, gunned, rammed or tamped in place to form the monolithic shape.

To accelerate the cure of the monolithic shape, one may use a hot torch, or apply the mix to a hot surface, or use an internal catalyst such as an acid or an amine. Preferred acids can be of both the organic and inorganic types such as toluene sulfonic acid, benzene sulfonic acid, methane, sulfonic acid, boric acid, phosphoric acid, sulfuric acid and the like. The amount of acid used would depend on the desired cure speed and typically would be in the range of 1% to 15% based on the binder solids weight.

EXAMPLES

In all of the examples, percentages are by weight unless otherwise noted. In examples using the aggregate, a typical coke aggregate mixture consists of approximately 40% fines, 35% intermediate, and 25% coarse aggregate. Fines are defined as aggregate which passes 100 mesh but is retaned on 200 mesh. Intermediate is defined as aggregate which passes 14 mesh but is retained by 100 mesh. Coarse is defined as aggregate passed through 4 mesh and retained by 14 mesh.

Also, in the examples, the liquid resole resin used was one having a viscosity of 150 cps to 400 cps as measured on a Brookfield RVF viscometer at 25° C. using a #1 spindle at 20 rpm, and the novolac resin had a total volatiles content at 135° C. of about 2% to 3%, including free phenol.

EXAMPLE 1

For each experiment an appropriate mixture of coke aggregate and binder was prepared. Three or four dogbones were prepared from each mixture, for testing. Tensile strength determinations were made on all dogbones. The values reported in Table 1, are averaged values based on determinations, generally on 3-4 dogbones.

In experiment 1—1, the ratio of novolac resin to resole resin was 4:1 by weight. The resole resin had viscosity of 150 cps to 400 cps and a solids content of 65% to 70%. Both the viscosity value and solids content were known when these resins were purchased, but both values changed during refrigerated storage prior to use, and were not determined at the time of use.

In experiment 1-2, the novolac resin solution used was composed of 60% to 65% by weight of novolac resin solids and 40% to 35% by weight of methanol. The viscosity of the solution was between 3,000 cps and 4,000 cps.

In experiment 1-3, the flake novolac resin was coated on hot aggregate, thus the term, "hot coated" under "Remarks".

In the case of the comparative example reported as a part of Example 1, and in all of the other comparative examples, no experiments were actually made using coal tar pitch. All information pertaining to commercial coal tar pitch products came from companies that made commercial products of this type.

Standard dogbones ½" thick were prepared and were used to make tensile strength determinations. The result of the tests are shown in Table I.

TABLE I

| Expt. No. | Type Binder | % Binder, Solids Basis | Tensile Strength p.s.i. | Remarks |
|---|---|---|---|---|
| 1-1 | Novolac resin 100° C. M.P., 7% hexa, and liquid resole resin | 9 | 192 | Cold coated, cold pressed and cured in an oven. |
| 1-2 | Novolac resin soln. in methanol 110° C. M.P., 9% hexa | 10 | 250 | Cold coated, cold pressed and cured in an oven. |
| 1-3 | Novolac flake resin, 110° C. M.P., 10% hexa | 7.5 | 410 | Hot coated then pressed. |
| 1-4 | Liquid resole resin, (150-400 cps), 65%-70% solids | 7.8 | 301 | Cold coated and cold pressed. |
| Comparative Example | | | | |
| 1-5 | Commercial Coal Tar Pitch | 15 | 300 | Typical values reported. |

The experiments of Table I demonstrate that by using either 7.5% of the novolac resin with 110° C. M.P. and 10% hexa as the binder or 7.8% of liquid resole resin as the binder, a product can be made that is comparable in tensile strength to the prior art coal tar product.

EXAMPLE 2

Resin samples were prepared corresponding to the binder compositions reported in Example I and then cured in an oven at 175° C. These resin-only specimens were then heated under a nitrogen atmosphere in a thermal analyzer. After exposure to temperatures of 800° C., the residual carbon of each sample was determined from the weight change in the specimen. Results are expressed in terms of percent by weight of residual carbon based on weight of binder used to make the specimen.

In each of the experiments about 3 to 4 samples were prepared. Each sample weighed 5 grams before curing. Coking value was determined for each sample. The values reported in Table II are averaged from determination made on the 3 to 4 samples.

TABLE II

| Resin Type | Typical Carbon (coking) Value, % |
|---|---|
| 2-1 Novolac resin (100° C., M.P.), and 7% hexa | 44-48 |
| 2-2 Novolac resin (110° C. M.P.), and 10% hexa | 56-60 |
| 2-3 Powdered novolac resin (110° C. M.P.) mixed with liquid resole resin, 150-450 cps, 65%-70% solids; 2 novolac; 1 resole by weight | 56-60 |
| 2-4 Novolac resin (120° C., M.P.), and 10% hexa | 60-64 |
| 2-5 Liquid resole resin (150-450 cps) | 35-40 |
| 2-6 Liquid resole resin (50-150 cps) | 35-40 |
| 2-7 Liquid resole resin (50-150 cps) and 5% hexa | 50-55 |
| 2-8 resole resin (150-450 cps) and 5% hexa | 50-55 |
| Comparative Example | |
| 2-9 Commercial coal tar pitch | 50-60 (typical reported value) |

This example shows that when the novolac resins or the resole resins of the invention are used as binders with hexa; or if the novolac resin and resole resin of this invention are combined and used as a binder, the coking value of the binder is comparable to the coking value using coal tar pitch as the binder.

EXAMPLE 3

Using a typical coke aggregate mixture, test specimens were prepared to establish the utility of this invention in anode, electrode, and cathode manufacture.

Standard 1"×1"×4" bar specimens were prepared, cured through a standard curing cycle to 175° C. then carbonized to about 1100° C. and tested for compressive strength, electrical resistivity, and chemical reactivity (erosion under electrolytic cell conditions). The results are reported in Tables III(A) and III(B).

TABLE III (A)

| No. | Density, gm/cc Cured @ 160 C. | Density, gm/cc Baked @ 1140 C. | Compressive Strength, psi | Tensile Strength, psi |
|---|---|---|---|---|
| E-312[1] | 1.35 | 1.34 | 1070 | 91 |
| E-314[1] | 1.40 | 1.37 | 1500 | 108 |
| E-316[2] | 1.49 | 1.47 | 1200 | 186 |
| E-317[2] | 1.47 | 1.44 | 2100 | 224 |
| Comparative Example (Reported Values)[3] | | | | |
| Coal Tar Pitch (15%-20%); | 1.5 | 1.5 | 1500 | 200 |

TABLE III (B)

| No. | Baked Density gm/cc | Electrical Resistivity (ohm-cm) | Reactivity (mg/cm$^2$-hr.) Air Burn 550° C./650° C. | Reactivity (mg/cm$^2$-hr.) $CO_2$ 970° C. |
|---|---|---|---|---|
| E-312[1] | 1.34 | 0.0134 | 98   235 | — |
| E-314[1] | 1.37 | 0.0096 | 93   235 | — |
| E-316[2] | 1.47 | 0.0054 | 70   252 | 11 |
| E-317[2] | 1.44 | 0.0052 | 72   253 | 10 |
| Commercial Pitch Anode (Reported Values)[3] | | | | |
| | 1.55 | 0.005 | 80   250 | 11 |

[1]E-312 and E-314 correspond to Examples 1 and 2 of Table I.
[2]E-316 and E-317 correspond to Example 3 of Table I. E-316 had 2% ethylene glycol added prior to cold pressing for density control. E-317 was pressed with the hot resin coated aggregate.
[3]Commercial values reported are using dynamic vibration techniques for efficient density control.

The results of these tests show that density correlates with properties such as strength, erosion resistance and electrical resistivity. In making shapes using a coal tar pitch, the aggregate-pitch mixture is usually subjected to dynamic vibration to effect better density control and is standard in commercial production. The specimens of this invention were not subjected to dynamic vibration and therefore, it can be expected that even better densities can be obtained when the binders of this invention are made using dynamic vibration.

It is apparent from Examples I through III that satisfactory and even superior performing anode-type parts can be made with the high carbon phenol formaldehyde binders of this invention. Since density is a major controlling factor in achieving the desired strength, electrical and reactivity properties, it should be apparent to one practicing the art that products made under well controlled commercial manufacturing conditions utilizing the phenolic resins of this invention compare favorably to coal tar pitch products in anode, electrode, and cathode type applications.

EXAMPLE 4

This example demonstrates the general utility of the selected novolac and resole resins of this invention as binders in monolithic shape construction and repair.

Using a coke aggregate mixture containing graphite powder, test specimens were made by mixing coke aggregate with each of the resin compositions of the Table IV, respectively. The resin and aggregate is mixed to achieve a paste-like consistency. In all cases the paste could be stored in a closed container for at least a week without any detrimental effects on the performance.

The paste was used in forming monolithic shapes by applying on a mold surface. After a set time of about one hour, the shape was dismantled from the mold an cured in an oven to form a hard piece.

The resole resin used in the experiments reported in Table VI contained 65% to 70% solids.

TABLE IV

| Binder: Resin Type | Amount of Binder used, %, Solids basis | Solid/Liquid Weight Ratio In Binder |
|---|---|---|
| 4-1 Novolac resin M.P. 110° C., with 9% hexa and ethylene glycol | 10 | 1:2 |
| 4-2 Novolac resin M.P. 115° C., with 9% hexa and ethylene glycol | 6 | 1:3 |
| 4-3 Novolac resin M.P. 110° C., with 9% hexa and a liquid resole resin, 150–450 cps | 10 | 1:4 |
| 4-4 Novolac resin M.P. 110° C., with 9% hexa and a liquid resole resin (50–150 cps) | 10 | 1:2 |
| 4-5 Novolac resin M.P. 110° C., and a liquid resole resin (150–450 cps) | 10 | 1:3 |
| 4-6 Novolac resin M.P. 110° C., and a liquid resole resin (50–150 cps) | 10 | 1:2 |

All of the above provided satisfactory shapes with adequate green strengths to be self-sustaining. These shapes were cured to be hard in an oven maintained at 200° C.

EXAMPLE 5

This example demonstrates the utility of the mixes of Example 4 as cold setting compositions. The compositions cure to a hard shape on standing at room temperature overnight at ambient conditions.

Using the coke aggregate mixture of Example 4, test specimens were made by mixing the aggregate with the resin compositions of Table IV and further adding to each mix sample as a catalyst a solution of paratoluene sulfonic acid/phosphoric acid/water, 2:1:2. The resin-to-catalyst ratio was maintained at 10:1 in each case. Shapes were formed by applying to mold surfaces. Cold setting occurred with the production of hard shapes after-hours.

While this Example illustrates the use of acid catalysts to control cure speed, one versed in the art would know how to use acids by themselves or in combination, as outlined in the above example, depending upon the mix life and cure speed criteria desired for a specific application. In addition to the acids mentioned, boric acid, citric acid or other Lewis acid donor compounds such as tin chloride and zinc chloride may be used. Amino compounds such as secondary and tertiary amines perform satisfactorily in these applications.

CONCLUSION

Among the many advantages of the invention, the following are important. Performance comparable to that obtained with a coal tar pitch is obtained at resin solids binder levels of 15% or less, often with 8% or less, resin solids. Purity levels for the resin in the binder can be closely controlled, which is increasingly difficult with coal tar pitch. This is a critical factor in the production of anodes and cathodes. In contrast, resins can be tailor-made to control quinoline insolubles, benzene insolubles, and the like. Substantial energy savings are also available in the reduced temperature needed for curing, because of the reduced mass of the binder and less dwell time in the curing pits.

In addition, anode porosity is more easily controlled, and improved erosion resistance may be attained. Generally, improved performance and strength characteristics are observed.

Importantly, pollution and gassing as well as carcinogenic risk may be minimized.

Processing conditions permit great flexibility. For example, isostatic or compression molding, vibration pressing, and extrusion may be used. Curing is also facilitated, as is carbonization, since at different stages, rapid temperature increase rates become feasible, especially for the carbonizing cycle.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A raw batch composition for use in making a shaped self-sustaining article comprising
    a mixture of a carbonaceous aggregate, a curable resin binder in sufficient quantity when cured to bond said aggregate into a desired shaped that is self-sustaining, and a curing agent effective for curing said resin under curing conditions,
    said binder comprising a phenol-formaldehyde novolac resin in particulate or hot melt form, having a melting point of at least 100° C. (212° F.) and a total volatiles content at 135° C. (275° F.) of not more than 5% by weight of said resin including a free phenol content of not more than 4% by weight of said resin as measured by gas chromatography analysis, the amount of resin solids in said binder being from about 6% to about 15% by weight based on the weight of said carbonaceous aggregate, said curing agent being present in sufficient amount to effect curing of said binder, under curing conditions.

2. The raw batch composition of claim 1 wherein said carbonaceous aggregate comprises coke particles having a particle size in the range from 4 mesh to 325 mesh.

3. The raw batch composition of claim 2 for use in making an electrode, wherein said carbonaceous aggregate further comprises powdered material selected from the group consisting of carbon, graphite, and mixtures thereof, wherein said aggregate has particle sizes in the range from 4 mesh to 325 mesh.

4. The raw batch composition of claim 2 for making an electrode, wherein said carbonaceous aggregate comprises a mixture of fine particles, coarse particles, and an intermediate fraction of particles, wherein said fines comprises about 40% of said mixture and pass through 100 mesh but are retained on 200 mesh, and said coarse particles comprise about 50% of said mixture and are passed by 4 mesh but retained on 14 mesh, and the intermediate fraction of particles comprises the balance thereof.

5. The raw batch composition of claim 4 for use in making electrodes, wherein said carbonaceous aggregate further comprises carbon powder, graphite powder, or mixtures thereof.

6. The raw batch composition of claim 3 wherein said carbonaceous aggregate comprises coke particles selected from the group consisting of petroleum coke, anthracite coke, and mixtures thereof.

7. The raw batch composition of claim 2 wherein said carbonaceous aggreagate further comprises powdered graphite, powdered carbon, or mixtures thereof, said powder having particle sizes predominantly in the range 200 mesh to 325 mesh.

8. The raw batch composition of claim 1 wherein said novolac resin has a melting point of at least 110° C. (230° F.).

9. The raw batch composition of claim 1 wherein said novolac resin has a volatiles content of not more than 2%.

10. The raw batch composition of claim 9 wherein said free phenol content is not more than 2%.

11. The raw batch composition of claim 8 wherein said novolac resin has a volatiles content of not more than 2% and said volatiles includes a free phenol content of not more than 2%.

12. The raw batch composition of claim 8 wherein said binder also comprises a liquid phenol formaldehyde resole resin having a viscosity of 50 cps to 450 cps as measured on a Brookfield RVF viscometer, at 25° C. with a #1 spindle at 20 rpm, said resole resin having a free phenol content of not more than 30% by weight.

13. The raw batch composition of claim 1 wherein said binder also comprises a plasticizer.

14. The raw batch composition of claim 12 wherein said binder also comprises a plasticizer.

15. The raw batch composition of claim 12 wherein said resole has a viscosity of 50 cps to 350 cps.

16. The raw batch composition of claim 15 wherein said resole resin has a viscosity in the range from 150 cps to 350 cps.

17. The raw batch composition of claim 15 for use in a ramming or tamping mix, wherein said resole has a viscosity in the range from 50 cps to 150 cps.

18. The raw batch composition of claim 1 wherein said curing agent comprises hexamethylenetetramine.

19. The raw batch composition of claim 18 wherein said hexamethylenetetramine is present in an amount of from 6%–10% by weight of said resin.

20. The raw batch composition of claim 12 wherein said curing agent is a Lewis acid.

21. A raw batch paste composition for use in making a shaped self-sustaining monolithic article comprising
a mixture of a carbonaceous aggregate and a binder comprising a curable unthickened liquid resole phenolic resin combined with at least 5% hexamethylenetetramine based on resin solids, said binder being present in sufficient quantity when cured to bond said aggregate into a desired shape that is self-sustaining,
said carbonaceous aggregate comprising coke aggregate having particle sizes in the range from 4 mesh to 200 mesh,
said liquid phenol formaldehyde resole resin having a viscosity in the range from 50 cps to 500 cps and a free phenol content of not more than 30%, the resin solids of said resole comprising from 6% to 15% by weight of said aggregate.

22. The raw batch composition of claim 21 wherein said carbonaceous aggregate comprises a mixture of fine particles, coarse particles, and an intermediate fraction of particles, wherein said fines comprise about 40% of said coke and pass through 100 mesh but are retained on 200 mesh, said coarse particles comprise about 50% of said aggregate and are passed by 4 mesh but are retained on 14 mesh, and the intermediate fraction has particles sizes in between those of the fines and coarse particles, and wherein the amount of said binder is from about 6% to about 8% resin solids based on the weight of said carbonaceous aggregate.

23. A raw batch composition for use in making a self-sustaining shape that can be pyrolized to form a carbonized shape, comprising
a mixture of carbonaceous aggregate and a binder,
said carbonaceous aggregate comprising coke aggregate having particle sizes in the range from 4 mesh to 200 mesh,
said binder comprising a phenolic resin that is selected from the group consisting of the (1) a phenolformaldehyde novolac resin in particulate or hot melt form, having a melting point of at least 100° C. (212° F.) and a total volatiles content at 135° (275° F.) of not more than 5% by weight of said resin including a free phenol content of not more than 4% by weight of said resin as measured by gas chromatography analysis, combined with a curing agent, (2) a mixture of a phenol-formaldehyde novolac resin in particulate or hot melt form, having a melting point of at least 100° C. and a total volatiles content at 135° C. of not more than 5% by weight of said resin including a free phenol content of not more than 4% by weight of said resin as measured by gas chromatography analysis, and liquid phenol-formaldehyde resole resin combined with at least 5% hexamethylene based on resin solids, said liquid resole resin having a viscosity in the range from 50 cps to 500 cps and a free phenol content of not more than 30%, and (3) liquid phenolformaldehyde resole resin that is free of any added thickening agent, combined with at least 5% hexamethylene based on resin solids, said unthickened liquid resole resin having a viscosity in the range from 50 cps to 500 cps and a free phenol content of not more than 30%, the resin solids of said binder comprising from 6% to 15% by weight of said aggregate, wherein said binder provides a weight of residual carbon following pyrolysis basis on the weight of the binder originally present prior to pyrolysis, of at least 35% by weight.

24. The raw batch composition of claim 23 wherein said binder has a weight of residual carbon following pyrolysis based on the weight of the binder originally present prior to pyrolysis of at least 50% by weight.

25. The raw batch composition of claim 24 wherein said residual carbon is in the range from 50% to 60% by weight.

26. The raw batch composition of claim 23 wherein said binder is said liquid phenol formaldehyde resole resin having a viscosity of 50 cps–500 cps.

27. The raw batch composition of claim 23 wherein said binder comprises said particulate or hot melt phenol formaldehyde novolac resin.

28. The raw batch composition of claim 27 wherein said mixture further comprises a curing agent that is effective for curing said binder under curing conditions, in a sufficient amount to effect curing of said binder under curing conditions.

29. The raw batch composition of claim 27 wherein said binder further comprises a liquid phenol formaldehyde resole resin having a viscosity of 50 cps.–500 cps.

30. A self-sustaining shape comprising a compacted mass of particles of coke aggregate bonded together by a binder, said binder comprising a cured phenol formaldehyde resin that prior to curing was selected from the group consisting of (a) a phenol formaldehyde novolac resin in particulate or hot melt form, having a melting point of at least 100° C., a total volatiles content at 135° C. of not more than 5% by weight of said resin including a free phenol content of not more than 4% by weight of said resin as measured by gas chromatography analysis, combined with a curing agent, (b) a mixture of a phenol-formaldehyde novolac resin in particulate or hot melt form, having a melting point of at least 100° C. and a total volatiles content at 135° C. of not more than 5% by weight of said resin including a free phenol content of not more than 4% by weight of said resin as measured by gas chromatography analysis, and liquid phenol-formaldehyde resole resin combined with at least 5% hexamethylene based on resin solids, said liquid resole resin having a viscosity in the range from 50 cps to 500 cps and a free phenol content of not more than 30%, and (c) a liquid phenol formaldehyde resole that is free of any added thickening agent, having a viscosity of at least 50 cps and a free phenol content not in excess of 30%, combined with at least 5% hexamethylene based on resin solids, said resin solids comprising from 6% to 15% of said aggregate by weight.

31. The self-sustaining shape of claim 30 wherein said coke particles, prior to being bonded together, had particle sizes in the range from 4 mesh to 200 mesh.

32. The self-sustaining shape of claim 30 wherein said resin is a room temperature cured resin.

33. The self-sustaining shape of claim 30 wherein said resin has been cured at an elevated temperature in the range 150° C. to 200°0 C. (302° F. to 392° F.).

34. The self-sustaining shape of claim 30 wherein said binder is a mixture of said novolac resin and said resole resin, and prior to curing contained from 6%–10% by weight based on the weight of the resin of hexamethylenetetramine.

35. The shape of claim 31 further comprising powdered carbon, powdered graphite, or mixtures thereof, said powder having particle sizes predominantly in the range 200 mesh to 325 mesh.

36. The shape of claim 31 that is adapted to be carbonized to make an electrode, wherein said liquid resole had a viscosity in the range from 150 cps to 350 cps.

37. The shape of claim 31, formed from a ramming mix, wherein said liquid resole had a viscosity in the range from 50 cps to 150 cps.

38. A shaped article formed by carbonizing a self-sustaining shape according to claim 30 comprising a compacted mass of particles of a carbonaceous aggregate bonded together by a resin binder, said resin binder solids providing upon carbonization at least 35% by weight of carbon based on the precured weight of said binder.

39. The shaped article of claim 38 wherein the binder of said self-sustaining shape, prior to curing, comprised a novolac curable at 150° C. to 200° C., having a melting point of at least 110° C., and a volatiles content at 135° C. of not more than 2% by weight of the resin including free phenol of not more than 2% as measured by gas chromatography analysis.

40. The shaped article of claim 39 wherein said binder prior to curing comprised a curing agent, and said curing agent was from 6%–10% by weight of hexamethylenetetramine based on the weight of the resin.

41. The shaped article of claim 38 wherein the binder, prior to curing, comprised a liquid resole resin having a viscosity in the range from 150 cps to 400 cps, containing from 10%–25% by weight of free phenol.

42. The shaped article of claim 38 wherein the binder, prior to curing, was a mixture of said novolac and said liquid resole, said novolac prior to curing being curable at 150° C. to 200° C., and said resole prior to curing had a viscosity of 50 cps to 400 cps and contained from 10%–25% by weight of free phenol, and wherein said binder prior to curing included a curing agent.

43. The shaped article of claim 38 formed by hot pressing and carbonizing.

44. The shaped article of claim 38 formed by cold pressing, curing, and carbonizing.

45. An electrode formed by carbonizing a self-sustaining shape comprising a compacted mass of particles of a carbonaceous aggregate comprising coke aggregate bonded together by a binder, said binder comprising a cured phenol formaldehyde resin that prior to curing was a phenol formaldehyde novolac resin in particulate or hot melt form, having a melting point of at least 100° C., a total volatiles content at 135° C. of not more than 5% by weight of said resin including a free phenol content of not more than 4% by weight of said resin as measured by gas chromatography analysis said binder further comprising, prior to curing, from 6%–10% by weight of the resin of hexamethylenetetramine, the resin solids of said binder comprising from 6% to 15% of said aggregate by weight.

46. The electrode of claim 45 wherein said binder provided a weight of residual carbon from carbonization of said binder, following carbonizing of said shape, and based on the weight of the binder originally present prior to carbonization, of at least 35% by weight of the original binder weight.

47. The electrode of claim 46 wherein said carbonaceous aggregate comprised coke particles having particle sizes in the range from 4 mesh to 200 mesh in admixture with a powder selected from the group consisting of carbon, graphite, and mixtures thereof, said powder having a particle size in the range 200 mesh to 325 mesh.

48. The electrode of claim 47 wherein the weight of said residual carbon following carbonization of said self-sustaining shape based on the weight of the binder originally present prior to carbonization, is at least 50% by weight of the original binder weight.

49. An electrode formed by carbonizing a self-sustaining shape comprising a compacted mass of particles of a carbonaceous aggregate comprising coke aggregate bonded together by a binder,
said binder comprising a cured phenol formaldehyde resin that prior to curing was a mixture of
(a) a phenol formaldehyde novolac resin in particulate or hot melt form, having a melting point of at least 100° C., a total volatiles content at 135° C. of not more than 5% by weight of said resin including a free phenol content of not more than 4% by weight of said resin as measure by gas chromatography analysis, and
(b) a liquid phenol formaldehyde resole having a viscosity of at least 150 cps and a free phenol content not in excess of 30%,
the resin solids of said binder comprising from 6% to 15% of said aggregate by weight.

50. The electrode of claim 49, said liquid resole having a viscosity in the range from 150 cps to 400 cps and containing from 10%-25% by weight of free phenol.

51. The electrode of claim 50 wherein said carbonaceous aggregate in said self-sustaining shape comprised a coke aggregate mixture of fine particles, coarse particles, and particles intermediate in size between said fine particles and said coarse particles, wherein said fines comprised about 40% of said aggregate and passed through 100 mesh but were retained on 200 mesh, and said coarse particles comprised about 50% of said aggregate and passed through 4 mesh but were retained on 14 mesh.

52. The electrode of claim 50 wherein said binder provided a weight of residual carbon, following carbonization of said self-sustaining shape based on the weight of the binder originally present prior to carbonization, of at least 50% by weight of the original binder weight.

53. The electrode of claim 52 wherein said carbonaceous aggregate further comprised a powdered carbon, graphite, or mixture thereof, having particle sizes in the range from 200 mesh to 325 mesh.

54. A process for making a body that can be pyrolyzed to form an electrode suitable for use in the electrolytic production of metal such as aluminum, prepared from carbonaceous aggregate, a resin binder comprising a phenol formaldehyde novolac resin in particulate or hot melt form, and hexamethylene tetramine, said novolac having a melting point of at least 100° C., a total volatiles content at 135° C. of not more than 5% by weight of said resin including a free phenol content of not more than 4% by weight of said resin as measured by gas chromatography analysis, comprising the steps of:
(a) mixing said aggregate with sufficient resin binder that the solids of said resin comprise 6%-15% by weight of said aggregate and with 6%-20% by weight of hexamethylenetetramine based on the weight of said phenol formaldehyde novolac to coat said aggregate until a free flowing aggregate coated material is formed;
(b) molding said free flowing aggregate coated material under pressure into the shape of said electrode; and
(c) heating said shape to cure the resin.

55. The process described in claim 54 in which said phenol formaldehyde novolac has a melting point of 110° C. or greater, a volatiles content of not more than 5%, and a free phenol content not more than 2%.

56. The process of claim 55 wherein said carbonaceous aggregate comprises powdered carbon, graphite, or mixtures thereof, having particle sizes predominantly in the range 200 mesh to 325 mesh.

57. The process of claim 55 wherein said binder further comprises a liquid resole resin having a viscosity in the range from 30 cps to 400 cps and containing not more than 30% free phenol.

58. A process for making a body that can be pyrolyzed to form a carbonized shape suitable for use in the electrolytic production of metal such as aluminum, prepared from carbonaceous aggregate comprising coke particles having sizes in the range from 4 mesh to 200 mesh, and a resin binder comprising a liquid phenol formaldehyde resole resin that is free from added thickening agent, and that is combined with at least 5% hexamethylenetetramine based on resin solids, said resole having a viscosity of 150 cps to 400 cps and containing not more than 30% by weight of free phenol, comprising the steps of:
(a) mixing said aggregate with sufficient resin binder that the solids of said resin comprise 6%-15% by weight of the weight of said aggregate;
(b) molding said mixture under pressure in the shape of said electrode; and
(c) heating said shape to cure the resin.

59. The process of claim 58 wherein said aggregate further comprises powdered carbon, graphite, or mixtures thereof, having particle sizes predominantly from 200 mesh to 325 mesh.

60. The process of claim 59 wherein said resole contains from 10% to 25% by weight of free phenol.

61. A composition useful as a tamping and ramming composition suitable for use in monolithic shape construction comprising a mixture of carbonaceous aggregate comprising coke particles having sizes in the range from 4 mesh to 200 mesh, and a material selected from the group consisting of carbon powder, graphite, and mixtures thereof, a binder comprising a phenol formaldehyde novolac resin, said novolac having a melting point of at least 100° C., a total volatiles content at 135° C. of not more than 5% by weight of said resin including a free phenol content of not more than 4% by weight of said resin as measured by gas chromatography analysis, plasticizer for said resin, and a curing agent, wherein the amount of resin solids in said binder amount to from 6%-15% by weight based on the weight of said carbonaceous aggregate.

62. The composition of claim 61 wherein said binder further comprises a liquid phenol formaldehyde resole having a viscosity of 30 cps to 150 cps as measured on a Brookfield RVF viscometer, at 25° C. with a #1 spindle at 20 rpm and a free phenol content not in excess of 30% by weight.

63. The composition of claim 62 which further comprises an acid accelerator selected from toluene sulfonic acid, benzene sulfonic acid, formic acid, boric acid, or sulfuric acid.

* * * * *